US011440301B2

(12) United States Patent
Piccin et al.

(10) Patent No.: US 11,440,301 B2
(45) Date of Patent: Sep. 13, 2022

(54) LIGHT PERMEABLE VEHICLE INTERIOR PANEL

(71) Applicant: Faurecia Interior Systems, Inc., Auburn Hills, MI (US)

(72) Inventors: Hugo Piccin, Cupertino, CA (US); Julien Mohy-Paci, Villerupt (FR)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/832,887

(22) Filed: Mar. 27, 2020

(65) Prior Publication Data

US 2021/0300006 A1 Sep. 30, 2021

(51) Int. Cl.
| | | |
|---|---|---|
| *B32B 3/24* | (2006.01) | |
| *B32B 27/12* | (2006.01) | |
| *B32B 3/26* | (2006.01) | |
| *B32B 7/12* | (2006.01) | |
| *B32B 38/04* | (2006.01) | |
| *B32B 27/20* | (2006.01) | |
| *B32B 27/36* | (2006.01) | |
| *B32B 5/02* | (2006.01) | |

(52) U.S. Cl.
CPC .............. *B32B 27/12* (2013.01); *B32B 3/266* (2013.01); *B32B 5/02* (2013.01); *B32B 7/12* (2013.01); *B32B 27/20* (2013.01); *B32B 27/365* (2013.01); *B32B 38/04* (2013.01); *B32B 2038/047* (2013.01); *B32B 2262/106* (2013.01); *B32B 2307/20* (2013.01); *B32B 2307/412* (2013.01); *B32B 2310/0843* (2013.01); *B32B 2605/003* (2013.01)

(58) Field of Classification Search
CPC ...................................................... B32B 3/266
See application file for complete search history.

(56) References Cited

U.S. PATENT DOCUMENTS

| | | | |
|---|---|---|---|
| 5,801,614 A | 9/1998 | Kokubu | |
| 2018/0009143 A1* | 1/2018 | Abe | ..................... H05K 5/0243 |

FOREIGN PATENT DOCUMENTS

| | | | |
|---|---|---|---|
| DE | 1 02017222476 A1 | 10/2017 | |
| FR | 3043036 B1 | 10/2015 | |
| GB | 2492232 B | 6/2011 | |
| JP | 2010044029 A | 8/2008 | |

* cited by examiner

*Primary Examiner* — William P Watkins, III
(74) *Attorney, Agent, or Firm* — Reising Ethington P.C.

(57) ABSTRACT

A vehicle interior panel includes a decorative layer formed from a material that blocks transmission of a range of wireless communication frequencies. Perforations are formed through the material so that the decorative layer permits wireless communication through the panel. The perforations may be formed in a pattern so that an illuminated pattern is displayed at a decorative side of the panel when backlit. The perforations can be made non-visible and enable the use of carbon fiber and other conductive materials in the decorative layer without sacrificing wireless communication capability.

20 Claims, 2 Drawing Sheets

LIGHT PERMEABLE VEHICLE INTERIOR PANEL

TECHNICAL FIELD

The present disclosure is related generally to vehicle interiors and, more particularly, to vehicle interior panels through which certain wavelengths of light must pass.

BACKGROUND

Decorative materials used in vehicle interiors are continuously evolving. In recent years, vehicle interior designs have trended toward materials such as carbon fiber weaves and metallic finishes that invoke an association with high-performance materials used in racing or aerospace. While there is not necessarily a functional reason for the high strength-to-weight ratio of carbon fiber or titanium as a layer of material on an interior trim panel, the inclusion of such materials in a vehicle interior provides an aura of exotica or supreme quality in workmanship. Such materials introduce certain problems when used decoratively in vehicle interiors rather than as a motorcycle exhaust shell or as the hood of a race car, however.

Japanese Publication No. 2010-044029 to Masaaki describes a vehicle instrument cluster with a carbon fiber layer. Through-openings in the shape of letters and numbers are cut through the carbon fiber layer so that the characters are visible and therefore useful to the driver, even in the absence of backlighting. Masaaki is silent regarding the transmission of non-visible wavelengths of light through the carbon fiber layer.

SUMMARY

An illustrative vehicle interior panel includes a decorative layer formed from a material that blocks transmission of a range of wireless communication frequencies. The decorative layer includes perforations such that an underlying wireless communicator that operates in that range of frequencies can communicate through the panel.

In various embodiments, the decorative layer comprises carbon fibers.

In various embodiments, the decorative layer includes metallized fibers.

In various embodiments, the perforations are non-visible from a decorative side of the panel.

In various embodiments, each perforation is sized from 10 µm to 70 µm.

In various embodiments, each perforation is sized at 20 µm or less.

In various embodiments, the vehicle interior panel includes a substrate underlying the decorative layer. The substrate is at least partially transparent to visible light such that visible light from an underlying light source is transmitted through the panel.

In various embodiments, the vehicle interior panel includes an adhesive layer between the decorative layer and a substrate. At least some of the perforations are directly over the adhesive layer, and the adhesive layer is at least partially transparent to visible light.

In various embodiments, the vehicle interior panel includes an adhesive layer between the decorative layer and a substrate. The substrate is plastic and the adhesive layer is formed from an elastomer.

In various embodiments, the vehicle interior panel includes an adhesive layer between the decorative layer and the substrate. The adhesive layer is non-continuous such that the adhesive layer does not lie directly beneath at least some of the perforations.

In various embodiments, an adhesive layer between the decorative layer and a substrate includes perforations aligned with the perforations in the decorative layer.

In various embodiments, the perforations are arranged in a pattern such that an illuminated pattern appears at a decorative side of the panel when the panel is backlit.

In various embodiments, a method of making the vehicle interior panel includes the step of forming perforations through the decorative layer of the panel. The step of forming the perforations permits a wireless communicator that operates in said range of frequencies to communicate through the panel.

In various embodiments, the perforations are formed with a laser.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a vehicle interior panel that includes a decorative layer made from a material through which certain frequencies of light, including visible light and certain radio frequencies of light, cannot be transmitted. Perforations are formed through the decorative layer to change the decorative layer from opaque to at least partially transmissive of the desired wavelengths of light. This transformation permits wireless communication through the panel and allows the panel to be backlit to visually convey information or additional aesthetics to a vehicle occupant.

Figure 1:
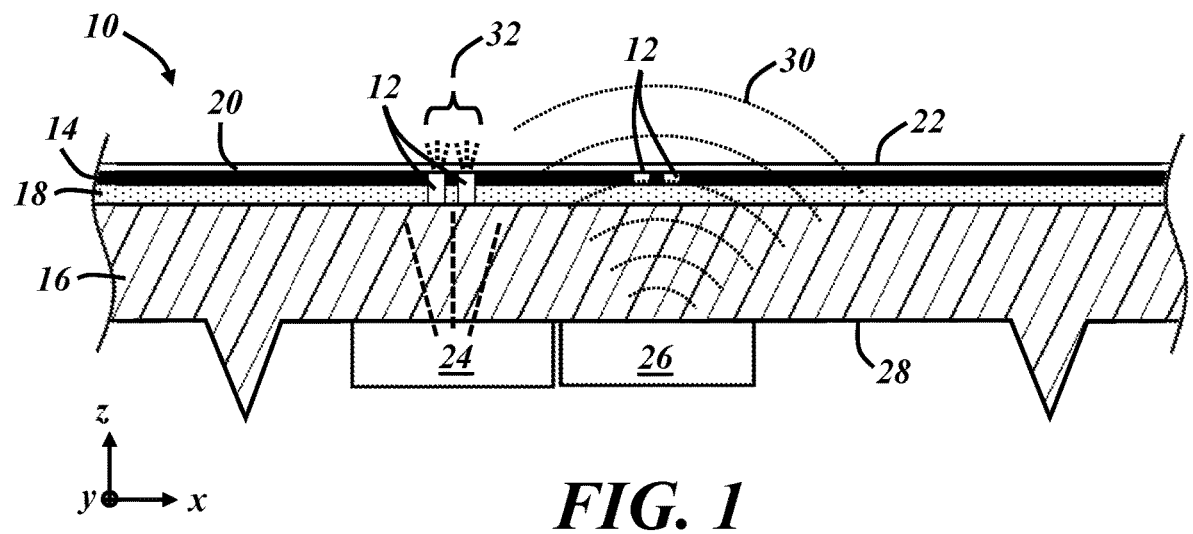
FIG. 1 is a cross-sectional view of a portion of a vehicle interior panel with perforations formed through a decorative layer.

FIG. 1 is a cross-sectional view of a portion of an embodiment of a vehicle interior panel 10 with perforations 12 formed through a decorative layer 14. The panel 10 includes a substrate 16, an adhesive layer 18 between the decorative layer 14 and the substrate, and a protective layer 20 overlying the decorative layer at a decorative side 22 of the panel. The illustrated panel also has a light source 24 and a wireless communicator 26 mounted along a back side 28 of the panel. The light source 24 and wireless communicator 26 may be integral components of the panel 10, or they may be separately provided beneath the panel when installed in the vehicle. The panel 10 may be an instrument panel, door panel, console panel, steering wheel panel, or any other panel used to trim a vehicle interior.

A layer of material of the panel 10 is considered a decorative layer if the layer is visible when viewed from the decorative side 22 of the panel, which is the side of the panel lining the interior of a passenger cabin when installed in the vehicle. In the example of FIG. 1, the decorative layer 14 is considered decorative because the protective layer 20 is at least partially transparent to visible light.

The decorative layer 14 may be formed from a material that blocks the transmission of a range of frequencies of light through a solid layer of the material. The range of frequencies may include visible light and/or non-visible wireless communication frequencies. Wireless communication frequencies are generally in the radio frequency portion of the electromagnetic spectrum. An example of a frequency range pertinent to present day automotive use is a range from 300 MHz to about 450 MHz, which is a range within which many keyless entry and keyless ignition systems communicate. Another example is a range from 2400 MHz to about 2500 MHz, which is a range within which certain short-distance wireless communication systems (e.g., Bluetooth®) operate. Another example is a range from 900 MHz to 5900 MHz, within which several WLAN (i.e., WiFi) communication channels operate. Another example is a range from 800 MHz to 1900 MHz, within which several channels for mobile phone or cellular network communication are identified. Some of these ranges overlap but together may be generalized as being between 300 MHz and 6000 MHz.

Examples of materials that normally block transmission of radio frequency signals generally include solid layers of electrically conductive materials, such as metallic materials and materials that include carbon fibers and/or are made up primarily of carbon fibers. One common carbon fiber-based material is a material in which bundles of carbon fibers are woven together. Other carbon fiber-based materials may include forged or unidirectional (UD) carbon fiber materials. Some carbon fiber-containing materials also include a resin component, which additionally makes the layer formable to a desired shape. For example, carbon fiber bundles may be impregnated with a curable resin component (e.g., epoxy) as a prepreg sheet of material that can be formed to the desired shape under pressure and simultaneously heated to cure the resin to maintain that shape.

When used as the decorative layer 14, a carbon fiber-based layer may also include other conductive, non-conductive, or surface conductive fibers. Examples of conductive fibers or filaments include aluminum, brass, copper, or titanium fibers. Examples of non-conductive fibers or filaments include acrylic, aramid, or glass fibers. Examples of surface conductive fibers include metallized glass or metallized carbon fibers. These additional types of fibers may be included to provide visual interest to a carbon fiber-based material in multitudes of combinations.

In some embodiments, the material from which the decorative layer 14 is formed is also opaque to visible light in the absence of the perforations 12. In embodiments in which the decorative layer 14 includes a layer of fibers, the fibers may be woven together with a sufficiently tight weave or sufficiently compacted or impregnated with an opaque resin component such that visible light is blocked in the absence of the perforations 12. Where a resin component is included in the decorative layer, it may be colored or tinted for additional contrast or visual interest.

The perforations 12 in the decorative layer 14 permit the wireless communicator 26 to transmit or receive a wireless signal 30 through the panel 10, which the decorative layer 14 would otherwise block. As such, the decorative layer 14 may include perforations 12 along only a portion of the panel 10 corresponding to the location of the underlying wireless communicator 26 and/or corresponding to the location of the underlying light source 24. When a light source 24 is included as in FIG. 1, the perforations 12 can function to make the panel 10 a backlit panel.

In some embodiments, the perforations 12 may be sized such that they are non-visible from the decorative side 22 of the panel. More particularly, the perforations 12 can be made non-visible in the absence of backlighting. As used herein, "non-visible" means not visibly detectable from a distance of 0.5 meters in normal daylight conditions by a person with 20/20 vision in the passenger cabin of the vehicle in which the panel is installed.

The size of the perforations 12 may be in a range from 10 μm to 70 μm. Whether the perforations 12 are non-visible may depend on factors other than their size. For example, perforations having a diameter or width of 10 μm may be non-visible under almost any condition and in almost any material. But perforations 12 having a diameter or width of 50 μm may be visible in a smooth decorative layer 14 (e.g., a metal film or a high resin-content carbon fiber product) while remaining substantially non-visible in a more three-dimensional decorative layer, such as a woven carbon fiber layer. Other factors such as color or reflectivity of the decorative layer 14, diffusivity of the protective layer 20, inter-perforation spacing, or the regularity of any pattern of perforations may also play a role in their visibility. Other factors such as process time must also be considered. For example, while smaller perforations 12 may naturally be less visible, the number of perforations required may increase to achieve the same transparency to the wireless signal 30, which can increase the time required to make the perforations.

Figure 2:
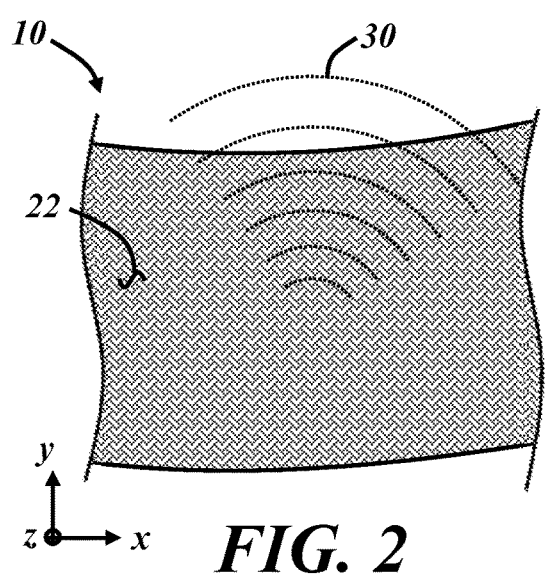
FIG. 2 is a plan view of a portion of a decorative side of the interior panel in the absence of backlighting.
Figure 3:
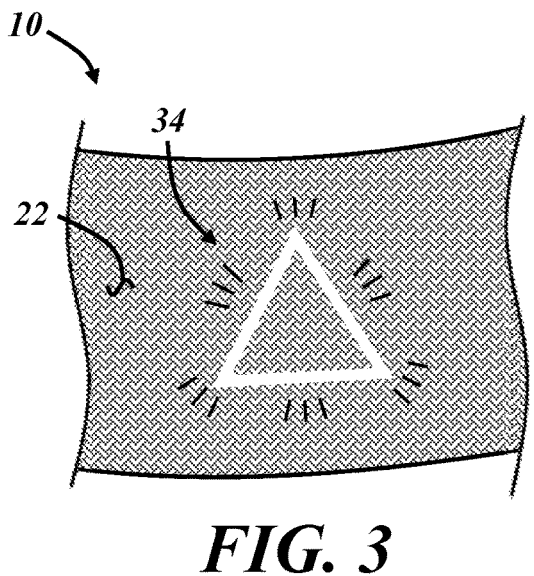
FIG. 3 is the portion of the decorative side of the interior panel of FIG. 2 when backlit.

With additional reference to FIGS. 2 and 3, the perforations 12 may be arranged in a pattern 32 such that an illuminated pattern 34 appears at the decorative side 22 of the panel 10 when the panel is backlit. FIGS. 2 and 3 depict an example in which the perforations in the decorative layer are non-visible. FIG. 2 depicts a wireless communication signal 30 passing through the panel 10 due to the presence of the perforations 12. In embodiments in which the panel 10 is not a back lit panel, this is all that will ever be visible—i.e., the decorative layer 14 visibly unchanged from its original wireless communication-blocking form with non-visible light able to pass through it. Even if the panel 10 is a backlit panel, its appearance is like that of FIG. 2 when the light source 24 is powered off or otherwise not emitting light.

The pattern 32 is any non-random arrangement of the perforations 12 along the decorative layer 14. In the illustrated example the pattern 32 of apertures 12 forms a triangular illuminated pattern 34. The illuminated pattern may be any sort of symbol, such as an alphanumeric character, a geometric shape, an icon, or any other non-random shape intended to visually communicate information to a user. Other non-random arrangements are possible, such as a repeating stripe pattern, a grid pattern, etc. The illuminated pattern 34 can be purely for visual appeal when backlit and does not have to communicate any information to the viewer.

The perforations 12 are discrete, and the spacing between adjacent perforations 12 of the pattern 32 may have an effect on the appearance of the illuminated pattern 34. For instance, the perforations 12 may be spaced sufficiently close together so that the illuminated pattern 34 is continuous—i.e., such that the presence of discrete underlying perforations is not discernible. In other examples, the perforations 12 may be spaced apart sufficiently to intentionally create a pixelated or digital effect in the illuminated pattern 34.

The optical clarity of the protective layer 20 may also have an effect on the overall appearance of the illuminated symbol 34. For example, while the protective layer 20 must be at least partially transparent to visible light in order for the layer 14 to be considered decorative, the protective layer 20 may be translucent such that at least some of the visible light passing through the protective layer is diffused—e.g., via scattering at its opposite surfaces or within its thickness. Light diffusing properties of the protective layer 20 can also help conceal the perforations 12 such that the perforations can be made larger than without a diffusive protective layer while remaining non-visible.

In one particular example, the perforations 12 are sized in a range from 10 μm to 30 μm, and each perforation 12 is spaced from an adjacent perforation by an amount in a range from 0.4 mm to 0.6 mm. With a partially diffusive protective layer 20, this arrangement of perforation 12 size and spacing has been observed to provide a non-visible pattern 32 of perforations and to display an illuminated pattern 34 in which the individual perforations are not discernible. This perforation size and spacing also converts the otherwise wireless communication-blocking material of the decorative layer 14 to a layer through which the wireless communication signal 30 can pass.

Additional features and details of the above features are further described in conjunction with an exemplary method of making the above-described panel 10, portions of which are illustrated in the sequential cross-sectional views of FIGS. 4A-4D. Not all of the illustrated steps are necessarily required, and other non-illustrated steps may be included.

Figure 4A:
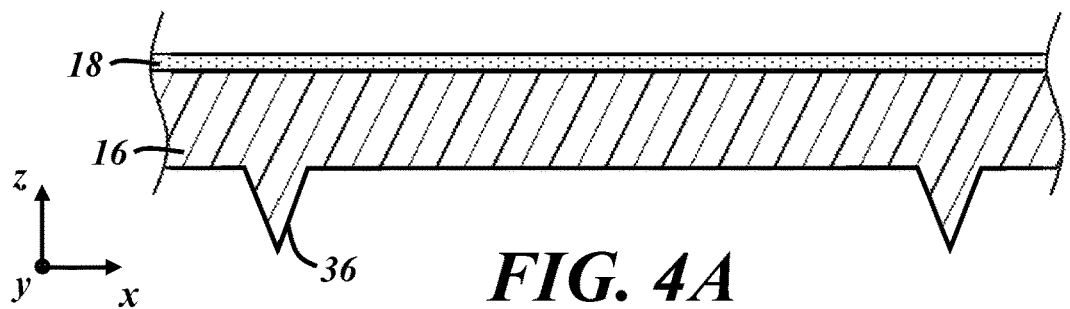
FIGS. 4A-4D are sequential cross-sectional views of a vehicle interior panel during a method of making the panel.

FIG. 4A is a cross-sectional view of the substrate 16 and the adhesive layer 18 disposed along an outer surface of the substrate. The substrate 16 is the physical support layer of the panel 10 and is at least partially transparent to light in a frequency range corresponding to the frequency at which the intended wireless communicator 26 communicates. The substrate 16 may for example be made from a plastic or plastic-based material. Plastic materials are generally transparent to radio frequency light, even when they are opaque to visible light. In embodiments in which the panel 10 is a backlit panel, the substrate 16 may be at least partially transparent to visible light as well. When light transmission is required through the substrate 16, light transmission properties must be balanced with structural properties, some of which depend on the overall size of the panel 10 and on its expected performance. While a perfectly transparent substrate 16 may be desirable, materials such as sheet glass, acrylic, and polycarbonate cannot typically meet the physical performance requirements of a vehicle interior panel, which can be very large (e.g., an instrument panel), must endure severe temperature extremes without changing shape, and must not exhibit brittle fractures in vehicle collision scenarios.

In one embodiment, the substrate 16 is a molded component formed from a translucent glass-fiber reinforced thermoplastic material in which the majority component is a transparent resin such as polycarbonate or acrylic. One suitable substrate material is a glass-fiber reinforced polycarbonate/ABS (PC/ABS) alloy. The glass fibers may be present in an amount between 10-30 wt % or approximately 20 wt %. In applications in which the panel 10 is relatively small and/or vertically oriented, the reinforcing fibers may be omitted to improve the optical clarity of the substrate 16 if desired. In some embodiments, the panel 10 is a relatively small subpanel of a larger interior panel, in which case, an unreinforced plastic material can be used for the substrate 16. For example, the panel 10 could be made for insertion into the outer side of a larger instrument panel, with the main body of the instrument panel being made from a reinforced plastic material without the requirement of optical clarity.

The illustrated substrate 16 includes reference positioners 36 used to position and fixture the substrate 16 and any attached layers or components in a repeatable location during subsequent manufacturing steps. The conical or triangular cross-sectional shapes of FIG. 4A are but one example of suitable positioners 36. The thickness of the substrate 16 may be in a range from 0.5 mm to 5.0 mm, or preferably from 1.5 mm to 3.0 mm.

The adhesive layer 18 may also be at least partially transparent to light in the wireless communication frequency range and/or to visible light. While most organic-based adhesive materials may allow transmission of radio frequency light through the material, not all adhesive materials are transparent to visible light. The adhesive layer 18 may have a thickness in a range from 0.05 mm to 3.0 mm, or preferably from 1.0 mm to 1.5 mm. In some cases, it is preferable that the adhesive layer 18 is made from an elastomeric material that can withstand relatively high elongation without permanent deformation. This is particularly true where the substrate 16 is a plastic-based material and the decorative layer 14 is metallic, and even more important when the decorative layer is a carbon fiber-based material. Plastics and metals have different coefficients of thermal expansion (CTE), and the adhesive layer 18 may therefore be tasked to endure the resulting differential strain during temperature changes. Some carbon fiber materials have a CTE of essentially zero, which causes even a higher difference in temperature induced dimensional change between the decorative layer 14 and the substrate 18.

One suitable material for the adhesive layer 18 is a polyurethane material. One particular polyurethane material is a two-component (2K) polyurethane in which two chemical components (e.g., isocyanate and polyol) are mixed just prior to application on the part or parts to be joined. As applied, the mixture forms a high viscosity liquid pre-cursor material that can be applied as a bead, such as along the perimeter of the parts to be joined. While the adhesive layer 18 in the figures is depicted as a continuous solid layer, the adhesive layer may be discontinuous. For example, discontinuities (i.e., openings in the adhesive layer where the adhesive material is omitted) may be located between the light source 24 and the perforations 12 wherever backlighting is desired, particularly when the adhesive material is opaque to visible light. In some cases, it may be desirable to have a full-surface adhesive layer 18 without discontinuities, to help dampen vibrations or to give the panel 10 a more solid (i.e., non-hollow) character. If backlighting is desired in those cases, the adhesive layer 18 may be formed from a material that is at least partially transparent to visible light. The uncured adhesive may be applied to the outer surface of the substrate 16 as in FIG. 4A, to the inner surface of the decorative layer 14, or to both surfaces to be joined. In some embodiments, the adhesive layer 18 is formed in a spray-on process in which a liquid adhesive material is coated onto one or both of the parts to be joined and allowed to cure after the parts are joined.

Figure 4B:
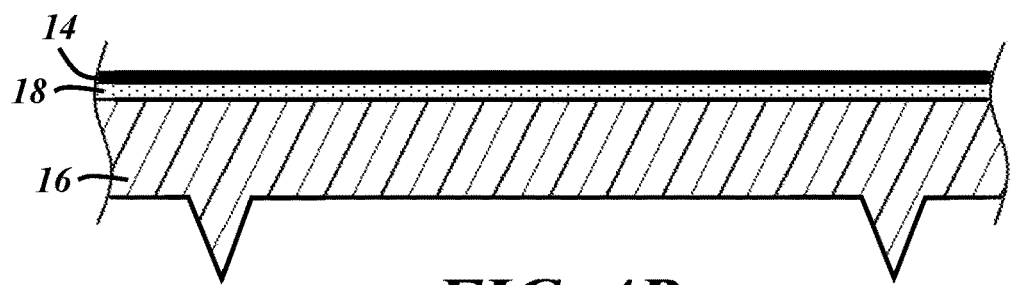

FIG. 4B is a cross-sectional view of the partially made panel after the decorative layer 14 has been attached to the substrate 16 via the adhesive layer 18. Other attachment methods are possible (e.g., snaps, fasteners, etc.). The composition of the decorative layer 18 is discussed above and may include one or more electrically conductive materials, such as metal or carbon fibers. The decorative layer 18 is shown as a flat layer for the sake of simplicity in the figures, but it may have a three-dimensional contour and may be pre-formed to the desired shape prior to attachment to the substrate 16. As noted above, carbon fiber-based or other fiber-based materials may begin as a sheet of the fibers, woven or otherwise bound together, impregnated with a curable resin material. This prepreg material can be formed under pressure to the desired shape and heated while in that shape to cure the resin, and thereby, the sheet of material. Alternatively, a mat of fibrous material such as woven carbon fibers can be clamped to shape in a mold prior to being impregnated with a curable resin in a resin transfer molding (RTM) operation. Other variations are possible.

The decorative layer 14 may have a thickness in a range from 0.5 mm to 2.5 mm, or preferably from 0.5 mm to 1.5 mm. In one example, the thickness of the decorative layer 14 is between 0.6 mm and 1.0 mm, or about 0.8 mm. In some embodiments, the decorative layer 14 is a decorative sheet complex with a primer layer along one or both oppositely facing surfaces to improve adhesion with the adhesive layer 18. In a particular embodiment, the decorative layer 14 comprises a 2-ply, 3-ply, or 4-ply carbon twill. Each ply may be approximately 0.4 mm in thickness. When the panel 10 is a backlit panel, the decorative layer 18 is preferable formed from a material that is opaque to visible light so that the perforations 12 are the only portions of the decorative layer 14 through which visible light passes. This can provide sharper definition to any illuminated symbol or icon formed along the decorative side 22 of the panel when backlit.

Figure 4C:
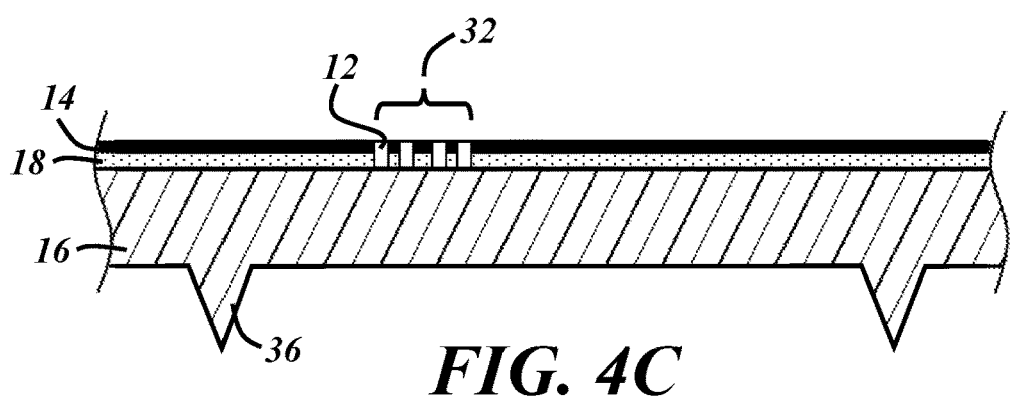

FIG. 4C is a cross-sectional view of the partially made panel after a pattern 32 of perforations 12 have been formed through the decorative layer 14. As noted above, the perforations 12 may have a diameter or width in a range from 10 µm to 70 µm, extending entirely through the decorative layer 14. The perforations 12 may extend at least partially through the adhesive layer 18 or entirely through the adhesive layer, as in FIG. 4C. Forming the perforations 12 through the adhesive layer 18 allows the adhesive layer to be formed from an optically opaque material, offering a larger selection of adhesives. As shown in FIG. 1, the perforations 12 may also extend only through the decorative layer 14 and not through the adhesive layer 18. It is also possible to extend the perforations 12 partly or entirely through the substrate 16.

The substrate locators 36 are useful in a perforation process to provide an accurate datum from which to locate each individual perforation 12. The perforations 12 can be formed via laser or any other suitable means of selective removal of the decorative layer 14. In one embodiment, an ultraviolet laser is used to form the perforations 12 in the desired pattern 32 along the decorative layer 14. In a particular embodiment, a 3 W hybrid fiber optic/WVO$_4$ crystal oscillator laser is used to form the perforations 12. In another embodiment, the perforations 12 are formed through the decorative layer 14 prior to attachment over the substrate 16. In that case, the perforations 12 may be filled with a resin material after formation to prevent the perforations from collecting debris during storage and transport from the perforating operation, particularly when the panel 10 is a backlit panel.

Figure 4D:
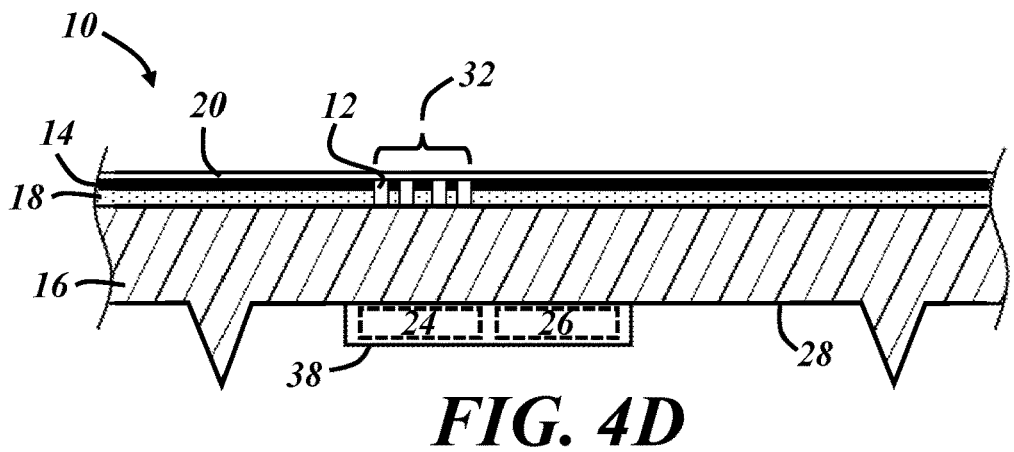

FIG. 4D is a cross-sectional view of the panel 10 after the protective layer 20 has been applied and a wireless communicator 26 has been disposed along the back side 28 of the panel. The protective layer 20 helps block ultraviolet light from sunlight during use and either fills or prevents later unwanted filling (e.g., by debris) of the perforations 12. As already noted, the protective layer 20 is at least partially transparent to visible light and also permits wireless communication through its thickness. The protective layer 20 can be translucent such that visible light passing through is partly diffused as discussed above, effectively blurring together visible light being emitted from individual perforations into a cohesive illuminated pattern 34, and further camouflaging the perforations 12 in the decorative layer 14 by twice diffusing visible ambient light reflected off of the decorative layer. The protective layer 20 may have a thickness in a range from 10 µm to 100 µm, preferably from 10 µm to 30 µm, from 15 µm to 25 µm, or about 20 µm. One suitable material for the protective layer 20 is polyurethane topcoat applied in one or more layers.

In the particular example of FIG. 4D, the light source 24 and wireless communicator 26 are provided as a single module 38, such as a printed circuit board, flex circuit, or other electronic circuitry. The module 38 is powered by a vehicle-based power source and may further include haptic feedback capability, such as a piezoelectric oscillator that causes vibrations to be induced in the panel when trigger by touch, proximity, or other input. The panel 10 may further include one or more sensors within or external to the layered structure to activate the light source 24 and/or the wireless communicator 26 upon user or environmental actuation. In some cases, the wireless communicator 26 includes one or more such sensors. The wireless communicator 26 may be activated via a proximity sensor or a radio-frequency identification (RFID) signal, for example. When included, the light source 24 may be activated via a proximity sensor, RFID signal, motion detector, a piezo-force sensor in the panel, or a lux meter, to name a few examples.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior panel, comprising:
a decorative layer formed from a material that blocks transmission of a range of wireless communication frequencies; and
a wireless communicator mounted along a back side of the panel that operates in said range of frequencies,
wherein the decorative layer includes discrete spaced apart perforations such that the wireless communicator can communicate through the panel.

2. The vehicle interior panel of claim 1, wherein the decorative layer comprises carbon fibers.

3. The vehicle interior panel of claim 1, wherein the decorative layer includes metallized fibers.

4. The vehicle interior panel of claim 1, wherein the perforations are non-visible from a decorative side of the panel.

5. The vehicle interior panel of claim 1, wherein each perforation is sized from 10 µm to 70 µm.

6. The vehicle interior panel of claim 5, wherein each perforation is sized at 20 µm or less.

7. The vehicle interior panel of claim 1, further comprising a substrate underlying the decorative layer, wherein the substrate is at least partially transparent to visible light such that visible light from an underlying light source is transmitted through the panel.

8. The vehicle interior panel of claim 7, further comprising an adhesive layer between the decorative layer and the substrate, wherein at least some of the perforations are directly over the adhesive layer and the adhesive layer is at least partially transparent to visible light.

9. The vehicle interior panel of claim 7, further comprising an adhesive layer between the decorative layer and the substrate, wherein the substrate is plastic and the adhesive layer is formed from an elastomer.

10. The vehicle interior panel of claim 7, further comprising an adhesive layer between the decorative layer and the substrate, wherein the adhesive layer is non-continuous such that the adhesive layer does not lie directly beneath at least some of the perforations.

11. The vehicle interior panel of claim 10, wherein the adhesive layer includes perforations aligned with the perforations in the decorative layer.

12. The vehicle interior panel of claim 1, wherein the perforations are arranged in a pattern such that an illuminated pattern appears at a decorative side of the panel when the panel is backlit.

13. A vehicle interior panel, comprising:
 a substrate comprising a plastic material;
 a decorative layer overlying the substrate formed from a material that blocks transmission of a range of wireless communication frequencies, wherein the material of the decorative layer comprises an electrically conductive material; and
 an adhesive layer attaching the decorative layer to the substrate,
 wherein the adhesive layer is elastomeric and can withstand a temperature-induced strain differential between the substrate and decorative layer without permanent deformation, and
 wherein the decorative layer includes perforations such that an underlying wireless communicator that operates in said range of frequencies can communicate through the panel.

14. The vehicle interior panel of claim 13, wherein the panel includes said underlying wireless communicator mounted along a back side of the substrate.

15. The vehicle interior panel of claim 13, wherein the adhesive layer has a thickness in between 1 and 3 millimeters.

16. A vehicle interior panel comprising a decorative layer formed from a material that blocks transmission of a range of wireless communication frequencies, wherein the decorative layer includes discrete spaced apart perforations such that an underlying wireless communicator that operates in said range of frequencies can communicate through the panel, and
 wherein the perforations are sized to be non-visible from a decorative side of the panel in the absence of backlighting.

17. The vehicle interior panel of claim 16, wherein each perforation is sized from 10 µm to 70 µm.

18. The vehicle interior panel of claim 17, wherein each perforation is spaced from an adjacent perforation by an amount in a range from 0.4 millimeters to 0.6 millimeters.

19. The vehicle interior panel of claim 16, further comprising:
 a substrate comprising a plastic material; and
 an adhesive layer attaching the decorative layer to the substrate,
 wherein the material of the decorative layer comprises metal or carbon fibers, and
 wherein the adhesive layer is elastomeric and can withstand a temperature-induced strain differential between the substrate and decorative layer without permanent deformation.

20. The vehicle interior panel of claim 16, wherein the panel includes said underlying wireless communicator mounted along a back side of the panel.

* * * * *